United States Patent [19]

Stouffer et al.

[11] 4,099,683
[45] Jul. 11, 1978

[54] CONSTANT PULL SAFETY BELT RETRACTING MECHANISM

[75] Inventors: Richard C. Stouffer, Auburn Heights; John Adams, Grosse Pointe Woods, both of Mich.

[73] Assignee: Allied Chemical Corporation, Morris Township, Morris County, N.J.

[21] Appl. No.: 764,945

[22] Filed: Feb. 2, 1977

[51] Int. Cl.² .................... A62B 35/02; B65H 75/48
[52] U.S. Cl. .................................. 242/107; 242/107.4 R
[58] Field of Search .................... 242/107–107.7; 280/744–747; 297/388; 185/37, 39

[56] References Cited

U.S. PATENT DOCUMENTS

| 3,997,126 | 12/1976 | Karlsson | 242/107 |
| 4,036,449 | 7/1977 | Schreiber | 242/107 |

*Primary Examiner*—Harvey C. Hornsby
*Assistant Examiner*—John M. Jillions
*Attorney, Agent, or Firm*—Roger H. Criss; Patrick L. Henry

[57] ABSTRACT

A safety belt retracting mechanism having constant pull includes a rotatable spool for storing the belt inside a housing. A conventional, positive coefficient of force spring inside the housing applies a retracting force to the spool and belt as the belt is pulled by the occupant. The spring is coupled between the housing and spool through a variable gear ratio gear train having a negative coefficient of force transfer characteristic. The negative transfer characteristic of the gear train compensates for the positive characteristic of the spring to provide constant pull to the belt between fully retracted and fully protracted belt positions. Three embodiments of the invention are disclosed. In one embodiment, the changing gear ratio is produced by a pair of oppositely oriented cone gears connected respectively to the spring and to a spindle supporting the belt spool. The cone gears are coupled together with a traversing pinion that lowers the force gear ratio of the cones as the belt is protracted by the occupant. In another embodiment, an approximately semicircular sector gear is mounted eccentrically on a shaft whereby the effective radius of the sector gear varies as a function of sector angle. The spindle is coupled to the spring (1) through a small radius portion of the sector gear when the belt is fully retracted, and (2) through progressively larger radius portions as the belt is protracted by the occupant providing the changing gear ratio. In a third embodiment, the gear train includes a pair of enmeshing sector gears and a number of intermediate spur gears. Each of the sector gears has an elliptical surface portion. When the belt is in a fully retracted position, the sector gears are oriented with the major axes thereof coincident to each other. As the belt is protracted, the enmeshing sector gears are each rotated by a maximum of 90°. Output shafts are attached to the sector gears at corresponding sides thereof and on the major axes. A continuously decreasing gear ratio provided by the elliptical surface portions of the sector gears as the belt is protracted produces the negative coefficient of force transfer characteristic of the gear train.

12 Claims, 12 Drawing Figures

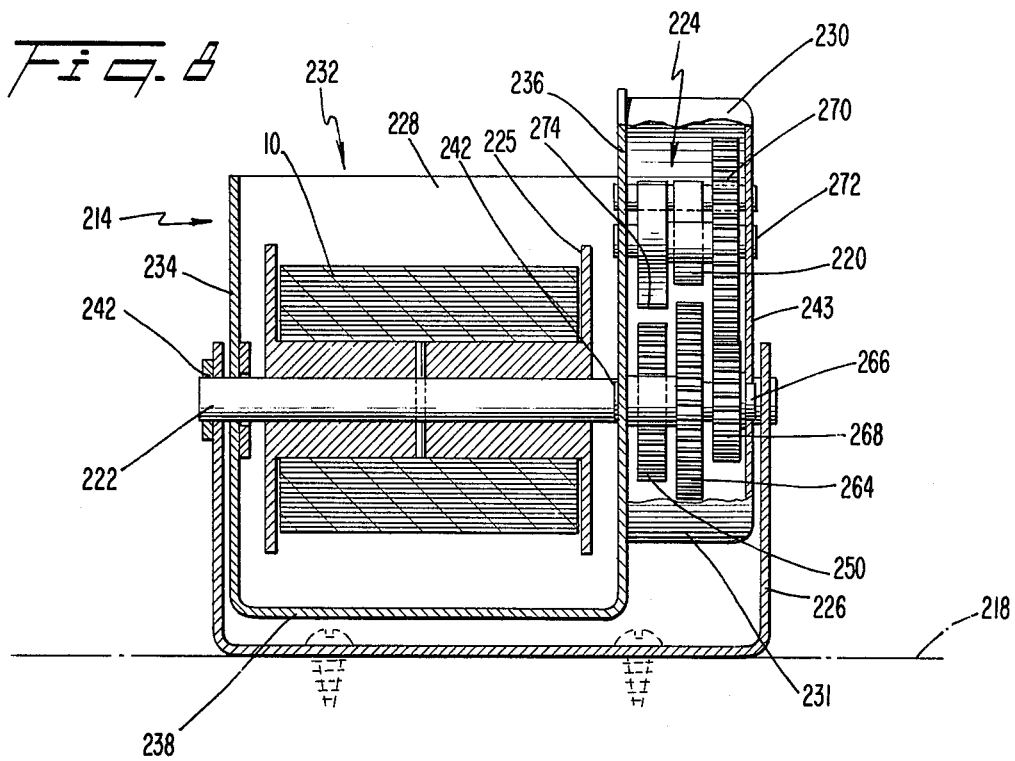
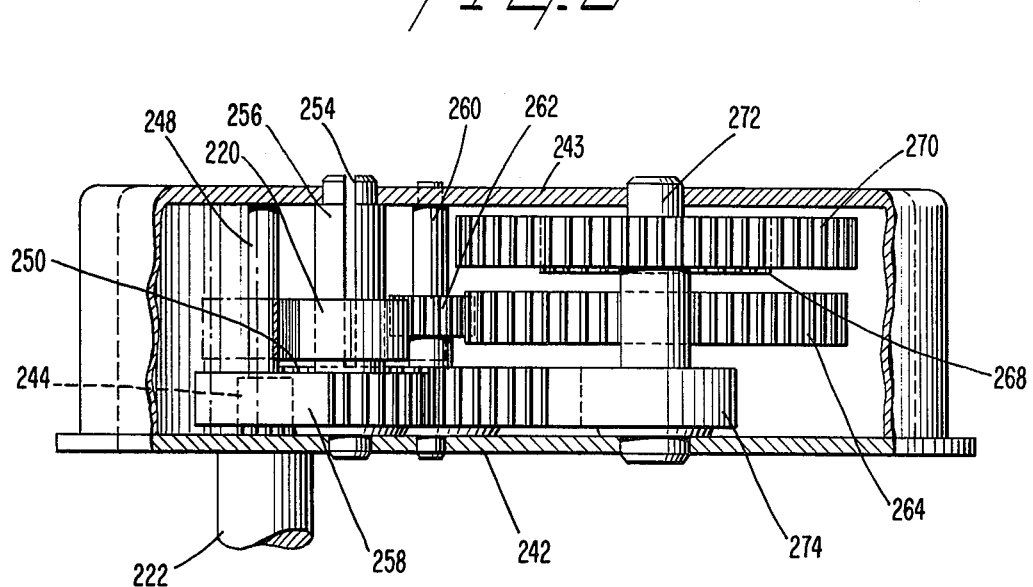

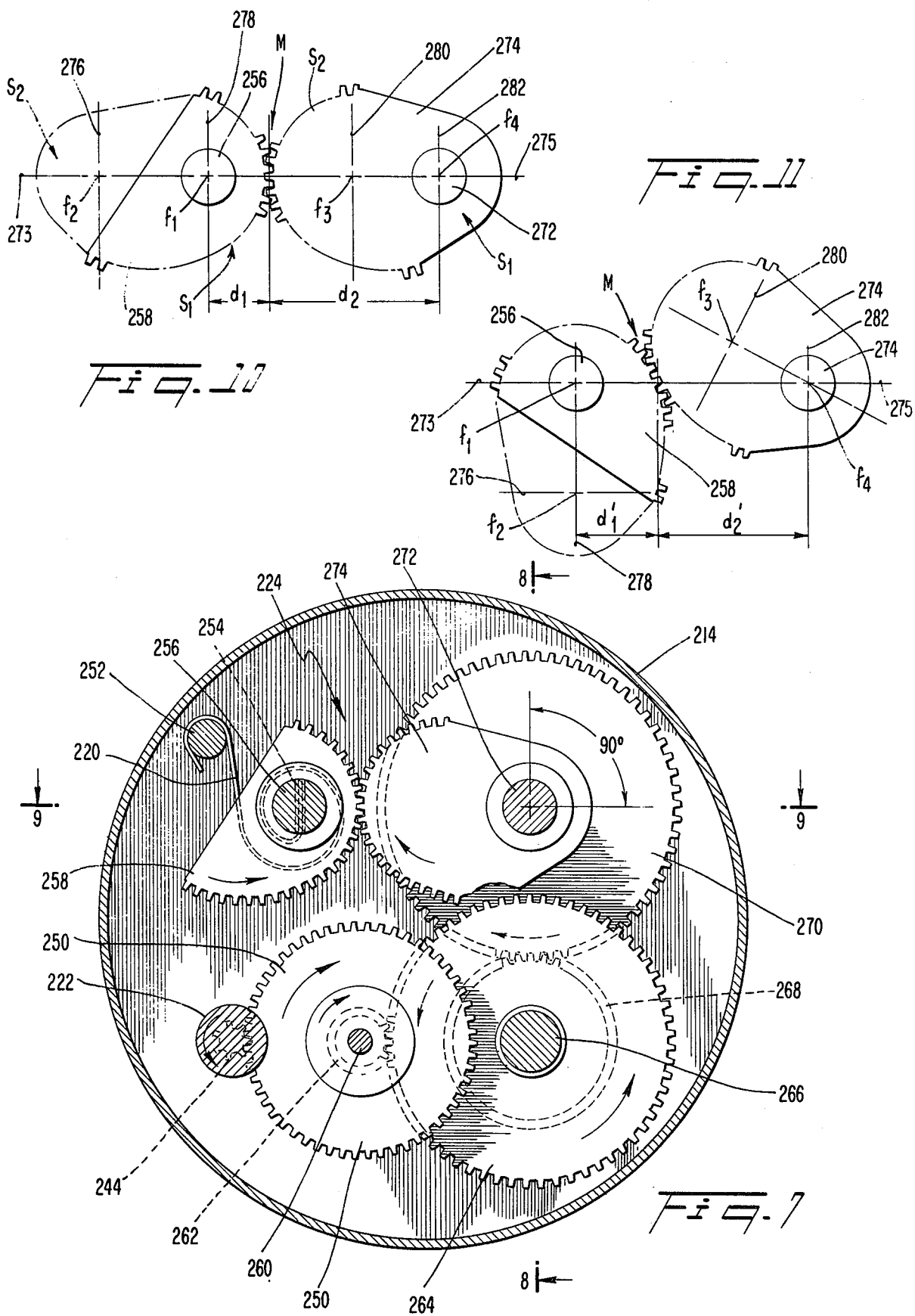

CONSTANT PULL SAFETY BELT RETRACTING MECHANISM

BACKGROUND OF THE INVENTION

The present invention relates generally to vehicle safety seat belt retractors, and more particularly, to constant force retractors which provide a substantially constant force to a lap or shoulder belt between the home (fully retracted) and fully extended positions.

In order to protect the occupants of a vehicle such as an automobile from injury during collision, turn-over, or excessive vehicle acceleration or deceleration, a safety belt is generally provided for each occupant of the vehicle. Each safety belt includes a shoulder belt that extends across the shoulder and chest of the occupant to protect against injury, and a lap belt that extends across the lap to retain the occupant in his seat. The lap and shoulder belts are retracted in a housing on separate reels when not in use by coil springs inside the housing. When seated, the occupant withdraws the lap and shoulder belts from the reels by grasping the exposed ends of the belts, and pulling outwardly, swinging the belts around the body for engagement with buckle elements of cooperating belt sections secured to the floorboard of the vehicle.

The spring for retracting each safety belt is typically a coil type spring that has a positive coefficient of force characteristic, i.e., the pull of the spring is proportional to spring deflection. As a result, pull on the belt tends to increase as the belt is withdrawn from the housing on the reel. The pull is minimum with belt fully retracted and is maximum with the belt fully extended.

The spring must be heavy enough to fully retract the belt into the housing so that the belt is out-of-sight when not in use. On the other hand, the pull should not be excessive with the belt fully extended because pressure against the shoulders and lap of the occupant causes discomfort. Furthermore, the belt is difficult to pay out against the increasing retracting force or pull provided by the spring. The discomfort caused by the excessive retracting force of the belt, and difficulty in payout discourage use of safety belts with accompanying increases in occupant injuries and deaths.

Accordingly, one object of the invention is to provide a safety belt retractor that exerts a pull on the belt that is constant between the fully retracted and fully extended belt positions.

In application Ser. No. 667,222, filed Mar. 16, 1976, to Schottoefer, assigned to the Assignee of the present invention, the retraction spring inside the reel housing of a safety belt retractor is continuously or stepwise tapered along the length of the spring to exert constant pull to the belt as the belt is protracted from the reel housing. While the tapered spring arrangement functions satisfactorily, the spring must be specially manufactured, and the narrow portions of the spring are somewhat prone to breakage.

An additional object of the invention, therefore, is to provide a new and improved safety belt retractor having constant retracting force that is durable and uses a standard helical coil spring.

SUMMARY OF THE INVENTION

In accordance with the invention, a vehicle safety belt retracting mechanism comprises a spool mounted to a spindle that is journalled on a housing. The spool is adapted to receive a safety belt in helical wrap and is rotatable in a winding direction to retract the belt into the housing, and in an opposite, unwinding direction. The belt is withdrawn by manually protracting the belt from the housing located on one side of the occupant. This causes the spool to rotate in the unwinding direction until the free end of the belt is in position for buckling to a buckle receiving member. The buckle receiving member is secured to the floorboard of the vehicle on the opposite side of the occupant.

A conventional, positive coefficient of force spring, located in the housing, is coupled between the housing and spindle through a variable ratio gear train having a negative coefficient of force transfer characteristic. As the belt is protracted from the housing, the retracting force produced by the spring continuously increases between the fully retracted or "home" position and the fully protracted position. The increasing spring force is compensated for by the negative coefficient of force transfer characteristic of the gear train resulting in constant pull of the belt.

In accordance with one embodiment of the invention, the variable ratio gear train comprises first and second, oppositely oriented cone gears mounted on mutually parallel shafts. The first cone gear shaft is attached to the spring and the second cone gear shaft forms the spool support spindle. The cone gears are coupled together by a traversing pinion gear. The pinion has a threaded central bore, and is mounted on a threaded portion of a shaft located between the two cone gears.

Spur and bevel gears, mounted respectively on the pinion shaft and spindle, mesh with each other so that the pinion shaft and spindle rotate together. The pinion traverses the threaded portion of the pinion shaft during retraction or protraction of the belt.

When the belt is fully retracted, the pinion meshes with a large radius surface portion of the second cone gear and with a smaller radius surface portion of the first cone gear for a high gear ratio. The high gear ratio produces relatively large force transfer between the spring and spindle. As the belt is manually protracted by the occupant, the pinion traverses the threaded portion of the pinion shaft toward lower gear ratios. The lower gear ratios produce less force transfer between the spring and spindle and compensate for increased spring force.

In another embodiment, the changing gear ratio of the gear train is produced by an approximately semicircular sector gear mounted eccentrically on a shaft and meshing with a pinion. The effective radius of the sector, defined as the distance between the shaft and rim, varies as a function of sector angle.

One end of the sector gear is secured to a spur gear and both are slidably journalled on an elongated guideway formed in the housing. The spur gear is maintained in enmeshment with an idler gear by a spring biasing the two gears together. The idler gear in turn meshes with another gear connected to the positive coefficient of force spring.

When the belt is fully retracted, the positive coefficient of force spring is coupled to the spindle through the pinion and a small radius portion of the sector gear. As the belt is protracted from the housing by the occupant, the sector gear rotates and the spring and spindle are coupled together through the pinion and progressively larger radius sector gear portions producing the changing gear ratio. As the sector gear rotates, it also traverses the elongated guideway to remain in enmeshment with the spur and pinion member.

In a third embodiment, the variable ratio gear train comprises a pair of cooperating sector gears having elliptical surface portions, each being defined by a major axis and a pair of minor axes. In addition, a number of spur gears are positioned between the sector gears and the spindle.

The sector gears are oriented such that with the belt in a home (fully retracted) position in the housing, the major axes of the sector gears are coincident. Output shafts are attached to the sector gears on the major axes at corresponding sector gear sides. The negative coefficient of force transfer characteristic of the gear train is caused by a continuously decreasing gear ratio produced by the sector gears as the belt is protracted. The diameters of the remaining gears of the gear train are such that rotation of the sector gears is limited to 90° between the fully retracted and fully protracted positions of the belt. The gear train has a "folded back" configuration so that the entire train can be contained within a compact, enclosed compartment of the housing. The spindle is located in an open compartment of the housing for access to the safety belt.

In each embodiment, the retractor includes a molded plastic housing having an enclosed compartment and an open-ended compartment. The gear train is located inside the enclosed compartment to prevent damage to the train caused by particles of foreign matter. The spool and belt are located in the open-ended compartment to permit access to the belt by the occupant.

Still other objects, advantages and features of the present invention will become readily apparent to those skilled in this art from the following description, wherein we have shown and described only the preferred embodiments of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 7 is a side view of a third embodiment of the invention with a portion of the retractor housing removed to expose the variable ratio gear train including a pair of sector gears that produce a negative coefficient of force transfer characteristic;

FIG. 8 is a cross sectional end view of the retractor mechanism taken along the line 8—8 in FIG. 7;

FIG. 9 is a cross sectional top view of the retractor mechanism taken along the line 9—9 in FIG. 7;

FIGS. 10 and 11 respectively, are schematic illustrations of the sector gears in their extreme positions of rotation.

DETAILED DESCRIPTION OF THE PREFERRED EMBODIMENTS

Figure 1:
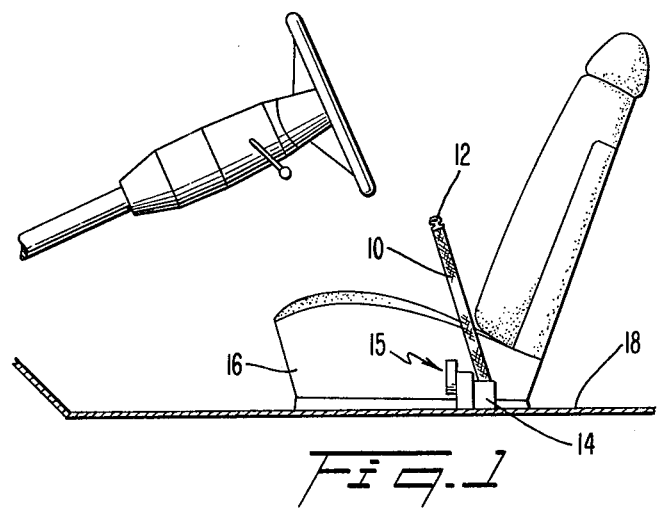
FIG. 1 is a side view of the passenger compartment of a vehicle illustrating the constant pull retractor mechanism of the present invention.

Referring to FIG. 1, an occupant restraining belt 10 having a buckle member 12 at one end thereof is protracted from housing 14 of a constant pull safety belt retractor 15 in accordance with the invention. Although not shown, when not in use, the belt 10 is fully retracted to a "home" position under force of a spring 20 inside the housing 14. When an occupant takes his position on seat 16, the occupant withdraws the belt 10 from the retractor housing 14 on his left and couples the buckle member 12 to a buckle receiving member (not shown) on his right secured to floorboard 18. The length of belt 10 is either preadjusted using an adjustment member (not shown) on the belt 10 itself or is adjusted automatically by a conventional one-way clutch. In the latter, the length of the belt is held with a pawl and ratchet arrangement inside the housing in an occupant restraining mode, but the belt is released in a non-restraining mode. The retracting mechanism may be switched between the occupant restraining and non-restraining modes using an inertial locking system such as the one described in U.S. Pat. No. 3,858,824 to Stephenson, assigned to the common assignee.

Figure 2:
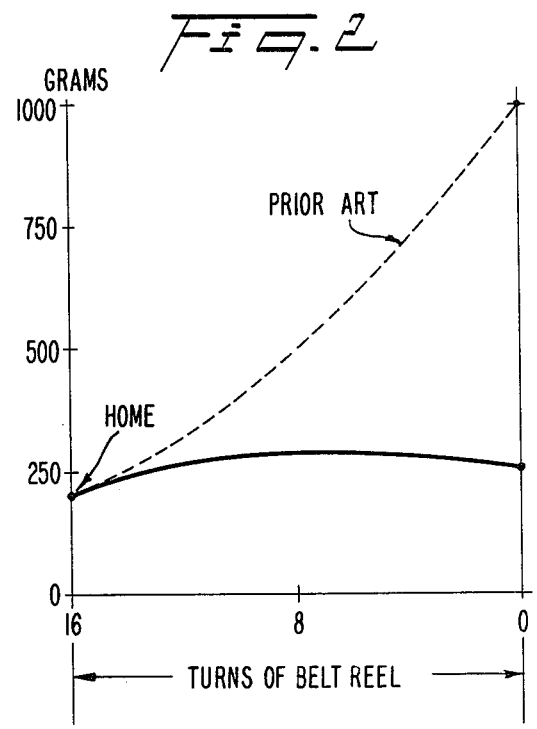
FIG. 2 is a graph illustrating belt retracting force as a function of number of revolutions of the belt reel in connection with a prior art retractor, as well as with the present invention.

As the belt 10 is pulled from retractor 15, a retracting force or pull is applied to the belt by spring 20 (see FIG. 3) in order to return the belt to the retractor when the belt is slackened or unbuckled. Spring 20 is formed of prestressed, spring steel and has a positive coefficient of force characteristic, that is, as the spring is deflected, it produces a restoring force that increases monotonically. As a result, the pull of spring 20 is minimum as shown in FIG. 2 when the belt is in a fully retracted position, and is maximum when the belt is fully protracted.

Figure 3:
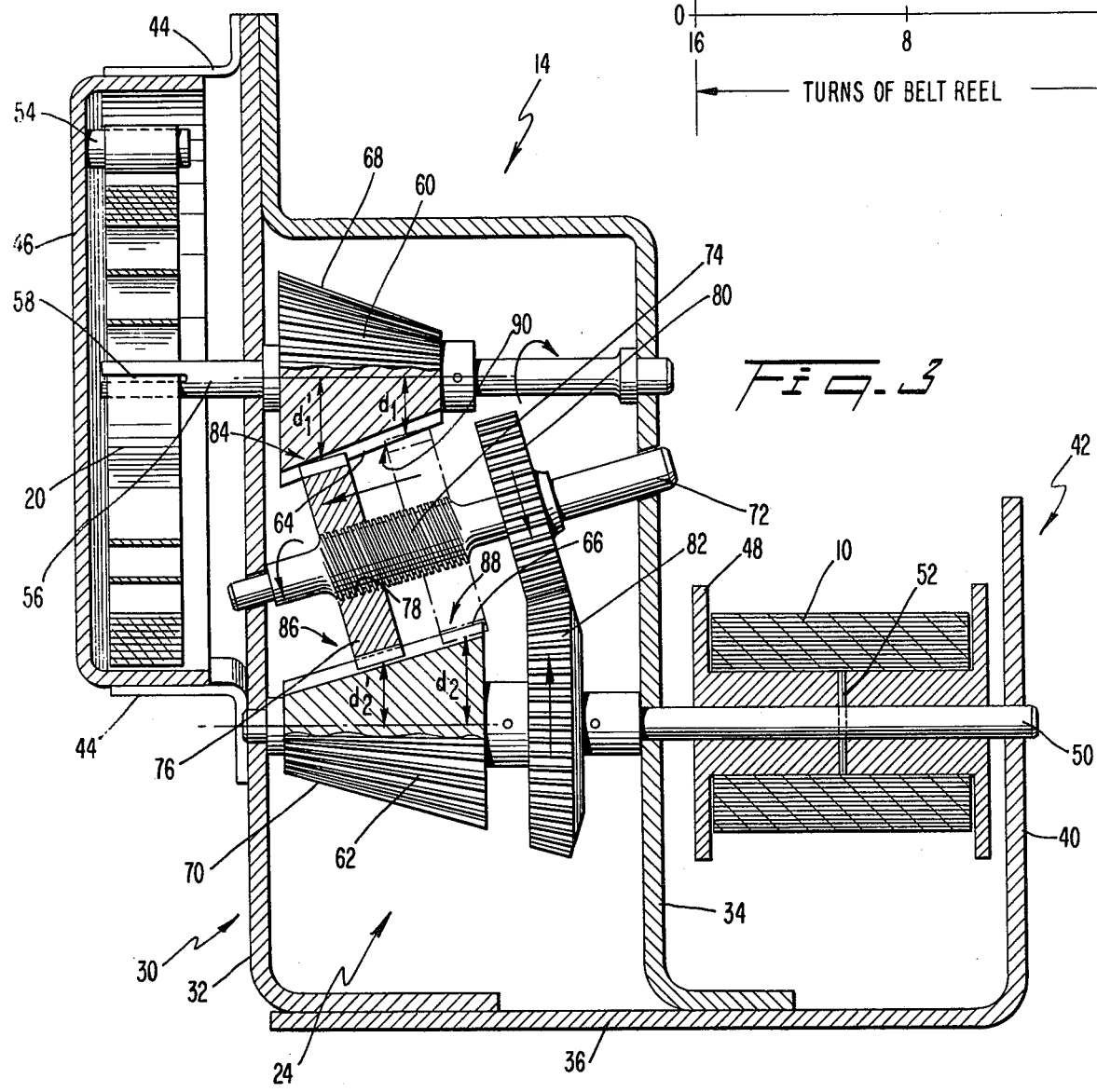
FIG. 3 is a cross-sectional side view of a first embodiment of the retractor showing the spring, gear train and belt spool.

In accordance with each embodiment of the invention, and referring first to FIG. 3 showing a first embodiment, a variable ratio gear train 24 inside housing 14 of the retractor 15 produces a negative coefficient of force transfer characteristic which compensates for the positive force characteristic of spring 20 to provide constant pull to the belt 10. Without the negative transfer characteristic of gear train 24, the belt 10 would be difficult to pull in the region of maximum protraction, making the buckle member 12 difficult to couple with the buckle receiving member (not shown). Also, the relatively strong retraction force on the belt when it is fully or nearly fully protracted would cause discomfort to the occupant (compare the dotted line representing a prior art retractor in FIG. 2 with the solid line representing the present invention).

Still referring to FIG. 3, the housing 14, formed of a sheet metal material, comprises a first compartment 30 defined by walls 32, 34 and base member 36. Base member 36 extends upwardly at portion 40 defining an open-ended compartment 42. A shroud 46 is supported to the wall 32 by brackets 44.

A spool 48 for receiving belt 10 in helical wrap is mounted on a spindle 50. The spool 48 is secured to the spindle 50 by a pin 52 so that the spool and spindle rotate together. Spindle 50 is journalled on the housing 14 at walls 34 and 40.

Within shroud 46, one end of the spring 20 is hooked around a stationary pin 54, and the opposite end of the spring is attached to a shaft 56 at an end slot 58. The shaft 56 is journalled on walls 32 and 34.

Gear train 24, located within the enclosed compartment 30, comprises a first cone gear 60 secured to shaft 56, and a second cone gear 62 secured to the spindle 50 of spool 48. Cone gears 60 and 62 are identical to each other, and are oriented in opposite directions with facing surface portions 64 and 66 parallel to each other, as shown. Similarly, opposite surface portions 68 and 70 of the cone gears 60 and 62 are also parallel to each other.

A shaft 72 is journalled on walls 32 and 34 equidistant between cone gears 60 and 62. Shaft 72 is parallel to the facing surface portions 64 and 66 of the cone gears 60 and 62 and contains a set of threads along a portion 74 of the shaft. A traversing pinion 76 containing a threaded central bore 78 is supported on the threaded portion 74 of shaft 72. The pinion 76 meshes with cone gears 60 and 62 and couples the two gears together for unequal but same direction rotation.

Also mounted on the shaft 72 at an unthreaded portion thereof is a spur gear 80 in enmeshment with a bevel gear 82 mounted on spindle 50. As a result of the meshing relationship of the gear members in gear train 4, clockwise rotation of cone gear 62 produces counterclockwise rotation of pinion 76 which in turn produces clockwise rotation of cone gear 60. Furthermore, during rotation of shaft 72, the pinion 76 traverses the threaded portion 74 of the shaft 72 because the speed of rotation of the pinion is less than the speed of rotation of its shaft. The difference in speeds is caused by relatively large constant radius bevel gear 82 in cooperation with the variable radius configuration of cone gear 62.

The effective radius of the cone gear 60, defined as the distance from the center of shaft 56 to a point of enmeshment between the cone gear and pinion 76, is identified by $d_1$ when the gear is in the position shown in phantom in FIG. 3 (when the belt is fully retracted). The effective radius is identified by $d_1'$ when cone gear 60 is in the position shown in solid lines (when belt 10 is fully protracted). Similarly, the effective radius of cone gear 62, defined as the distance between the center of spindle 50 and a point of enmeshment M between cone gear 62 and the pinion 76, is defined by $d_2$ when the pinion is in the position shown in phantom, and by $d_2'$ in the position shown in solid lines.

When belt 10 is fully retracted on spool 48, spring 20 is in a condition of minimum stress, i.e., only enough retracting force is produced by the spring to retain the belt inside the housing. Pinion 76 is located on a righthand end of the set of threads 74 on shaft 72, as shown in phantom in FIG. 3. In the position, the pinion 76 meshes with surface 64 of cone gear 60 at a small radius portion 90 and with surface 66 of cone gear 62 at a large radius portion 88. The ratio $d_2/d_1$ is greater than unity.

As belt 10 is pulled from the retractor 15 toward a fully protracted position, spur gear 82 and cone gear 62 are rotated clockwise when viewed from the right in FIG. 3 (see arrows). The cone gear 62 and spur gear 82 rotate the pinion 76 and spur gear 80 counterclockwise, that is, in a direction opposite the direction of rotation of gears 62 and 82. The pinion 76 in turn rotates the cone gear 60 clockwise, winding spring 20 in shroud 46.

As shaft 72 rotates counterclockwise, pinion 76 traverses the threaded portion 74 to the left in FIG. 3 until the pinion is located at the lefthand end of the threaded portion as shown in solid lines in FIG. 3. In that position, the pinion 76 meshes with surface 64 of cone gear 60 at a large radius portion 84 and with the surface 66 of cone gear 62 at smaller radius portion 86. The ratio $d_2'/d_1'$ is less than unity.

The gear ratio of cone gears 60 and 62 is defined as the ratio of delivered to applied forces, or alternatively, as the ratio of the angular speeds of the driving and driven gears. The force transfer gear ratio is proportional to the expression $d_2/d_1$ or $d_2'/d_1'$. Since the ratio $d_2/d_1$ is greater than unity when belt 10 is fully retracted and continuously decreases toward the ratio $d_2'/d_1'$ which is less than unity when the belt is fully or nearly fully protracted, the coefficient of force transfer characteristic produced by the cone gears 60 and 62 is negative. As belt 10 is protracted, coupling of force from cone gear 60 to cone gear 62 decreases, thereby compensating for the increasing retracting force of spring 20 as it is wound by shaft 56. The result is a substantially constant, positive retracting force on belt 10 between the home and fully protracted belt positions illustrated in FIG. 2.

Figure 4:
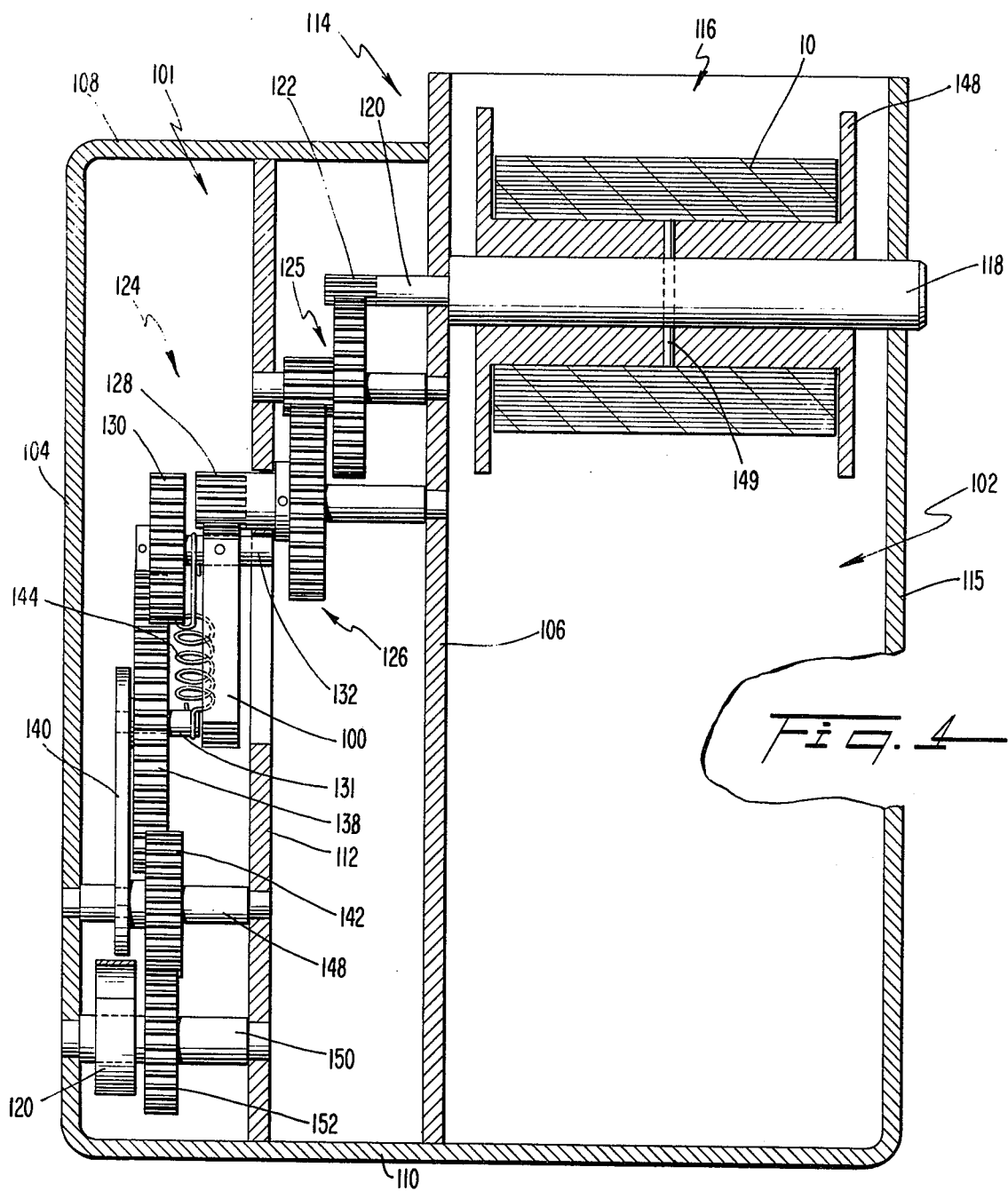
FIG. 4 is a cross-sectional side view of the retractor mechanism using a semicircular sector gear as a component of a variable ratio gear train in accordance with a second embodiment of the invention.
Figure 5:
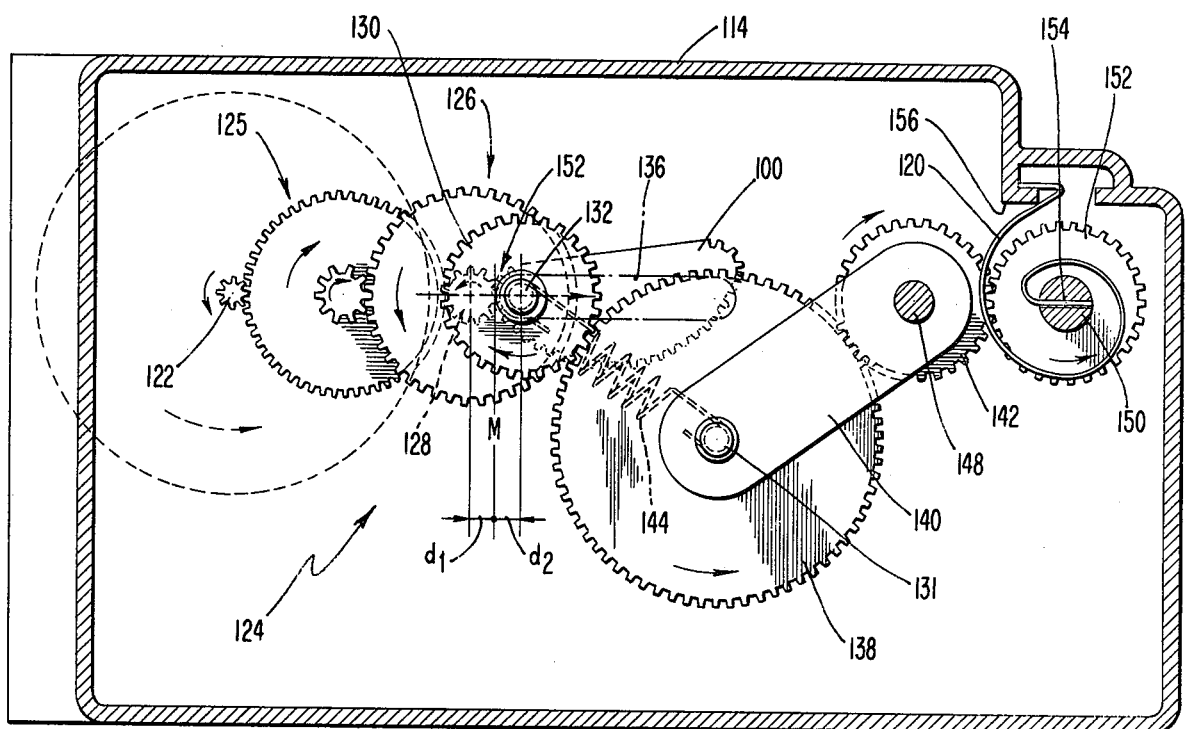
FIG. 5 is a cross-sectional end view of the retractor mechanism of FIG. 4 showing the variable ratio gear train when the belt is fully retracted.
Figure 6:
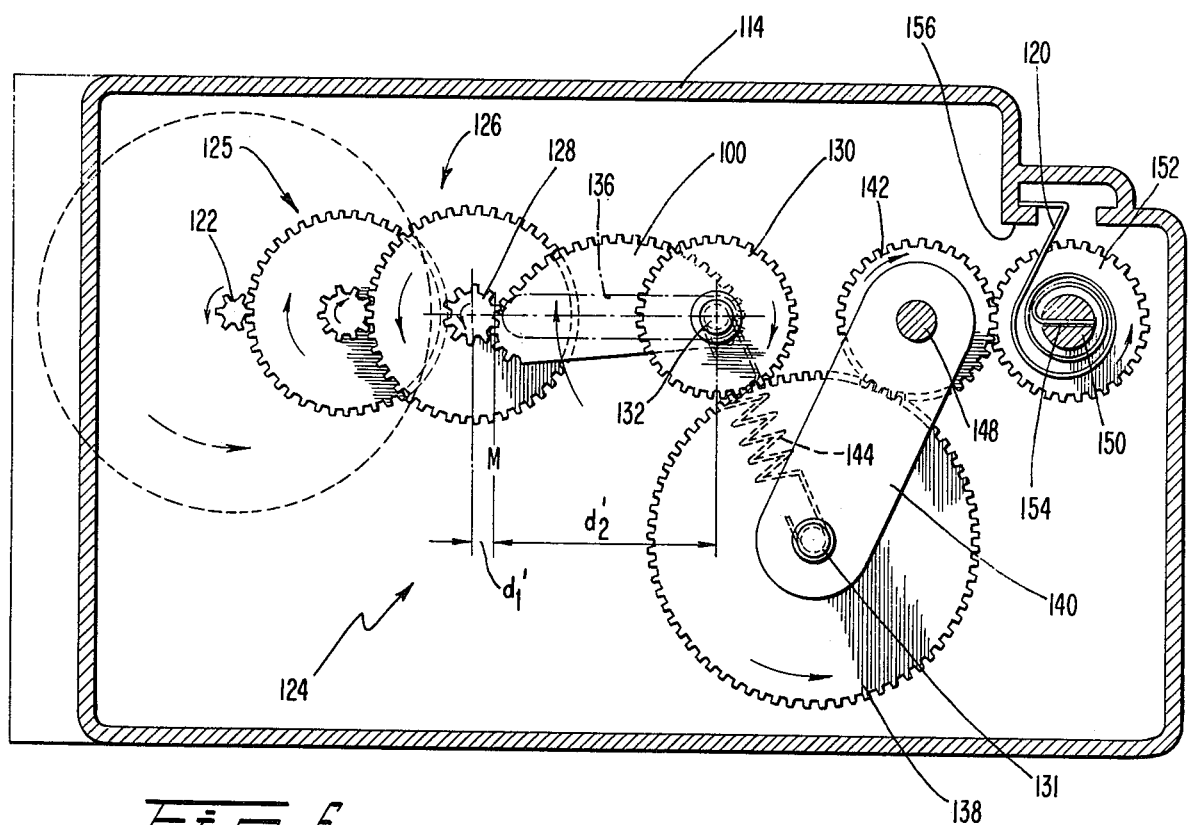
FIG. 6 is a cross-sectional end view of the retractor showing the gear train when the safety belt is fully protracted.

Referring now to FIGS. 4–6, in a second embodiment of the invention, the changing gear ratio that produces the negative transfer characteristic of a gear train 124 is produced by an approximately semicircular sector gear 100 that meshes with a constant radius pinion 128. Housing 114, formed of a sheet metal material, includes a first enclosed compartment 101, and a second open-ended compartment 102. The enclosed compartment 101 is defined by upstanding walls 104 and 106 joined together by cooperating integral walls 108 and 110. The compartment 101 also includes an intermediate wall or partition 112.

Open-ended compartment 102 is defined by upstanding walls 106 and 115 as well as by the cooperating wall 110. Upstanding wall 106 is common to both of the compartments 101 and 102. End 116 of compartment 102 is open for access to safety belt 10 by the occupant.

Safety belt 10 is stored on spool 148 in helical wrap as shown. Spool 148 in turn is mounted on spindle 118 and secured thereto by pin 149 so that the spool and spindle rotate together. The spindle is journalled on walls 106 and 115 of housing 114.

Extending into the enclosed compartment 101, a small diameter extension of spindle 118 is formed with a pinion 122. The pinion 122 meshes with a spur and pinion member 125 constituting one element of the gear train 124. The member 125, journalled on walls 106 and 112, in turn meshes with a second, similarly journalled spur and pinion member 126. Member 126 includes a pinion 128 that meshes with sector gear 100, as best shown in FIG. 6.

Of particular importance, one side of the sector gear is secured to a shaft 132 to which is also secured a spur gear 130 whereby the spur and sector gears rotate together. The effective radius $d$ of sector gear 100 is defined as the distance between shaft 132 and a point of enmeshment M between pinion 128 and the rim of the sector. It is apparent that the minimum effective radius $d$ changes continuously during rotation of sector gear 100.

Shaft 132 of sector gear 100 and spur gear 130 is journalled on an elongated guideway 136 formed in wall 112. As sector gear 100 rotates, the shaft 132 traverses a portion of the wall 112 within guideway 136 to maintain the rim of the sector gear 100 in enmeshment with pinion 128.

Meshing with spur gear 130 is an idler gear 138 journalled on shaft 131 at one end of an arm 140. A gear 142 mounted on shaft 148 is journalled on the opposite end of the arm 140 and on wall 112 (see FIG. 4). The arm 140 is free to pivot about shaft 148. A spring 144 is engaged between shaft 132 of the gear 130 and shaft 131 of idler gear 138. The spring 144 biases the idler gear 138 into engagement with gear 130. The idler gear 138 accordingly couples together the gears 130 and 142.

Also journalled on the walls 104 and 106 is a shaft 150 supporting a gear 152. One end of the shaft 150 contains a longitudinal slot 154. One end of spring 120 is located in slot 154 of shaft 150 and the other end of the spring is seated on a flange 156 formed on the housing 114. Shaft 150 rotates together with gear 152 so that as the gear is rotated counterclockwise (see arrow in FIG. 6) the spring is wound, and as the gear is rotated clockwise, the spring is unwound.

Referring to FIG. 5, when belt 10 is fully retracted, pinion 128 of spur and pinion member 126 meshes with the small radius rim portion 152 of sector gear 100. The effective radius $d_2$ of the sector gear at rim portion 152 is approximately equal to the radius $d_1$ of pinion 128.

As the belt 10 is protracted from housing 114 by the occupant, spindle pinion 22 rotates counterclockwise (see arrows in FIG. 5) causing spur and pinion member 125 to rotate clockwise, as shown. When belt 10 is fully protracted, sector gear 100, spur gear 130 and idler 138 are in the positions shown in FIG. 6.

As sector gear 100 rotates clockwise from the fully retracted position shown in FIG. 5, the effective radius of the sector increases urging the shaft 132 to the right within the guideway 136, as shown by the arrow. At the same time, gear 130 also rotates clockwise. The spur gear 130 meshing with idler gear 138 rotates the idler counterclockwise. Idler 138 rotates gear 142 clockwise, and the gear 142 in turn rotates gear 152 counterclockwise thereby winding spring 120.

As spring 120 is wound during counterclockwise rotation of gear 152, the spring applies a restoring force to the pinion 122 through each of the gear elements of gear train 124. This force attempts to rotate gear 152 clockwise and gear 142 counterclockwise. Idler gear 138 is thus acted on by the restoring force in a direction to rotate the idler clockwise. The restoring force on idler 138 also urges shaft 132 of spur gear 130 and sector gear 100 toward the left in FIGS. 5 and 6 maintaining the sector gear 100 in enmeshment with pinion 128.

When the belt 10 is fully protracted by the occupant, the sector gear 100 is oriented in the position shown in FIG. 6 with shaft 132 displaced from pinion 128 by the maximum effective radius $d_2'$ of the sector gear 100.

The manner in which gear train 124 produces the negative force transfer characteristic that compensates for the positive characteristic of spring 120 is summarized as follows. It is apparent that in FIG. 5, when belt 10 is fully retracted, the effective radius $d_2$ of the sector gear 100 (distance between shaft 132 and point of enmeshment M) is minimum. Force transfer from sector gear 100 to pinion 128 is maximum. In FIG. 6, on the other hand, when the belt is fully protracted, the effective radius $d_2'$ of the sector gear 100 is maximum and the force transfer between the sector and pinion 128 is minimum. The increasing effective radius of sector gear 100 between $d_2$ and $d_2'$ as the belt is protracted produces the negative coefficient of force characteristic that compensates for the positive force characteristic of spring 120. The result is an approximately constant retracting force or pull applied to belt 10.

Referring now to FIGS. 7–12, a safety belt retractor 215, in accordance with a third embodiment of the invention, contains the standard positive coefficient of force spring 220 coupled between housing 214 and a spindle 222 through gear train 224. The belt 10 is wound on a spool 225 in helical wrap.

Housing 214, which is preferably formed of a sheet metal material, is mounted to a U-shaped support member 226 suitably secured to floorboard 218 (FIG. 8). The housing 214 includes a first compartment 228 containing belt spool 225, and a second compartment 230 containing gear train 224. The first compartment 228 has an open end 232 for access to belt 10; the second compartment 230 is enclosed on all sides to protect the gear train 224 from damage caused by particles of foreign matter.

Open ended compartment 228 is formed by upstanding walls 234 and 236 joined together by a base 238. Wall 236 is common to compartments 228 and 230 of the housing 214. The enclosed compartment 230 is formed by walls 236 and 243 as well as cylindrical wall 231. Spindle 222 is journalled on walls 234 and 236 of the open ended compartment 228 at bearings 242. Belt spool 225 is secured to the spindle 222 so that the spindle and spool rotate together.

One end of the spindle 222, extending into compartment 230 through housing walls 236, contains a pinion gear 244. Inside the housing 214, the pinion gear 244 is supported by a shaft 248 extending between wall 243 and the pinion (see FIG. 8). The shaft 248 maintains pinion 244 in enmeshment with a first spur gear 250 of the gear train 224.

One end of spring 220 is anchored to housing 214 at pin 252 (FIG. 7). Spring 220 is formed of a spring steel strip prestressed in a helical coil configuration, as best shown in FIG. 7. The opposite end of spring 220 is seated within notch 254 of a hub 256 that is secured to a first sector gear 258 of gear train 224.

The gear train 224 transfers rotation of sector gear 258 under the force of spring 220 to the pinion gear 244. Of particular importance, and as described in more detail below, the non-circular configuration of sector gears 258 and 274 of the gear train 224 produces a negative coefficient of force transfer characteristic whereby coupling of force between spring 220 and pinion gear 244 decreases as a function of deflection of spring 220. This negative characteristic, as aforementioned, compensates for inherent positive coefficient of force characteristic spring 220 to provide a resultant retracting force or pull to the belt that is constant between fully retracted and fully protracted belt positions.

As best seen in FIG. 7, spur gear 250 is attached to a shaft 260 that is journalled between walls 242 and 243 of the housing (see also FIG. 8). Also secured to shaft 260 is a pinion gear 262 that meshes with a spur gear 264.

In a similar manner, spur gear 264 is mounted on a shaft 266 to which is also mounted a gear 268. Gear 268 meshes with a spur gear 270 mounted on a shaft 272 to which is also mounted a second sector gear 274. The second sector gear 274 in turn is in enmeshment with the first sector gear 258.

The gears 250, 264, 268, 270 and 274 are oriented in housing 214 such that spring 220 is located approximately vertically in-line to spindle 222. The "folded back" configuration of gear train 224 meets the compact packaging requirements of the retractor 215, and permits the gear train 224 to be contained within compartment 230 of housing 214.

The negative coefficient of force transfer characteristic of the gear train 224 is, as aforementioned, provided by the non-circular configuration of sector gears 258 and 274. The enmeshing rim portions of sector gears 258 and 274 are approximately elliptical. Referring to FIGS. 10 and 11, sector gear 258 is made in the form of a truncated ellipse defined by a major axis 273 and minor axes 276 and 278. Major axis 273 and minor axis 278 intersect at focus $f_1$ on side $s_1$ of the ellipse, and the major axis and minor axis 276 intersect at focus $f_2$ on side $s_2$. Shaft 256 of sector gear 258 is secured to the sector gear at focus $f_1$.

Sector gear 274 is also made in the form of a truncated ellipse defined by a major axis 275 and minor axes 280 and 282. The major axis 275 intersects the minor axis 280 at focus $f_3$ on side $s_2$ of the ellipse and major axis 275 intersects the minor axis 282 at focus $f_4$ on side $s_1$. Shaft 272 is secured to sector gear 274 at focus $f_4$. Comparing sector gear 258 with sector gear 274, it is apparent that shafts 256 and 272 are attached to the sectors respectively at corresponding sides $s_1$ thereof. The distance between the center of shaft 256 and a point of enmeshment M between sector gears 258 and 274 is defined by $d_1$, and the distance between the center of shaft 272 and point M is defined by $d_2$.

When belt 10 is in the home position, that is, fully retracted within housing 214 of the retractor 215, sector gears 258 and 274 are oriented as shown in FIGS. 7 and 10 with major axes 273 and 275 coincident to each other. Spring 220 is in a condition of minimum stress so that just enough force is transferred to pinion gear 244 to retain spool 225 in a fully wound condition.

Referring to FIG. 7, as belt 10 is withdrawn from housing 214, pinion gear 244 rotates in a counterclockwise direction (see arrow) causing spur gear 250 and pinion gear 262 to rotate clockwise. Pinion gear 262 rotates spur gear 264 and gear 268 counterclockwise, and gear 268 rotates spur gear 270 along with sector gear 274 clockwise. Sector gear 274 causes sector gear 258 to rotate counterclockwise winding spring 220.

As spring 220 is wound around shaft 256 of sector gear 258, the spring applies a retracting force to the shaft which is transferred to spool 225 through gear train 224. As the spring 220 is further wound around shaft 256, the retracting force produced by the spring increases progressively due to the positive coefficient of force spring characteristic.

The relative diameters of the individual gears constituting the gear train 224 are such that when the belt 10 is fully retracted from housing 214, sector gear 274 rotates approximately 90° clockwise and sector gear 258 in turn rotates approximately 90° counterclockwise to the positions shown in FIG. 11.

The gear ratio of sector gears 258 and 274 is defined as the ratio of delivered to applied forces, or alternatively, as the ratio of the angular speeds of the driving and driven gear members. The force transfer gear ratio is proportional to the ratio $d_2/d_1$ (see FIGS. 10 and 11). Of particular importance, the ratio $d_2/d_1$ of sector gear 258 and sector gear 274 as shown in FIG. 11, is smaller than the ratio $d_2'/d_1'$ shown in FIG. 10. The reason the ratio decreases is that the profiles of these gears 258, 274 are elliptical. As the sector gears 258 and 274 rotate in the direction shown, the distance $d_1$ progressively increases toward $d_1'$ while the distance $d_2$ progressively decreases toward $d_2'$. As a result, the force transfer characteristic of the gear train 224 is negative whereby force coupling between spring 220 and pinion gear 244 decreases as the spring is progressively deflected.

Figure 12:
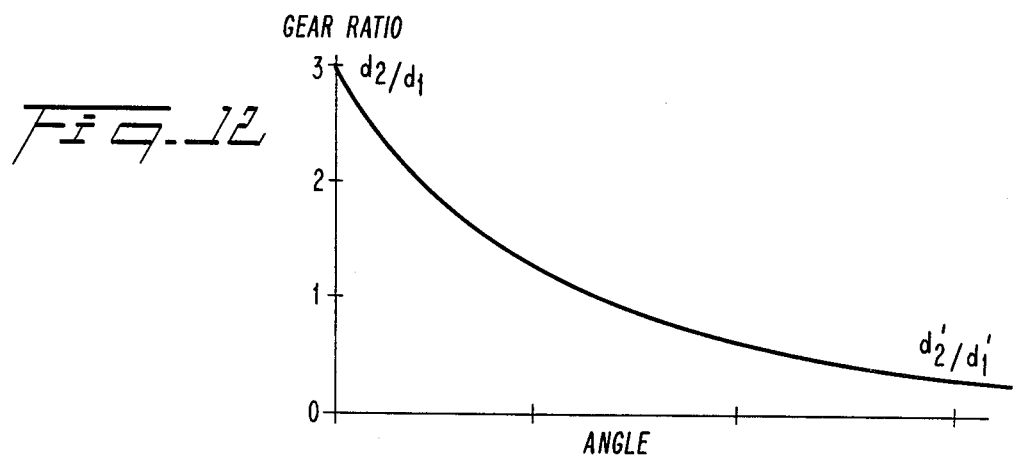
FIG. 12 is a graph illustration the force transfer characteristic of the sector gears shown in FIGS. 10 and 11.

The transfer characteristic of sector gears 258 and 274 is shown in FIG. 12. It is noted that the transfer ratio $d_2/d_1$ is maximum at the ordinate of the graph representing an angle of zero (this corresponds to the home position shown in FIG. 10) and decreases substantially at an angle of 90°, as shown in FIG. 11. The negative slope of the curve is maximum near the ordinate of the graph.

In this disclosure there is shown and described only the preferred embodiments of the invention, but as aforementioned, it is to be understood that the invention is capable of use in other environments and is capable of changes or modifications within the scope of the inventive concept as expressed herein. For example, it is apparent that the principles of the present invention can be applied to a safety belt retractor for a shoulder belt as well as for a lap belt as has been described in the specification.

What is claimed is:

1. In a vehicle safety system including a safety belt adapted to restrain an occupant in position on a seat, a safety belt constant pull retracting mechanism comprising, in combination:

a housing;

storage means for storing said safety belt, said storage means operative for retracting and protracting said belt;

positive force characteristic biasing means for biasing said storage means for retraction of said belt; and gear train means for coupling together said biasing means and storage means, said gear train means having a negative coefficient of force transfer characteristic compensating for the positive coefficient of force transfer characteristic of said biasing means, a resultant pull applied to said belt thereby being approximately constant as said belt is protracted;

said gear train means including variable gear ratio means for varying a gear coupling ratio during protraction of said belt and comprising:

(a) first and second cone gears oriented with facing inclined sides thereof parallel to each other and mounted respectively on first and second parallel shafts; and (b) coupling means for coupling together said cone gears at a first, high force transfer gear ratio when said belt is fully retracted, and at a second, lower force transfer gear ratio when said belt is fully protracted, said coupling means comprising a pinion gear mounted on a rod provided between said first and second shafts, said pinion gear meshing with facing sides of said cone gears; a spur gear secured to said rod and a bevel gear secured to said shaft of said second cone gear, said spur and bevel gears being in enmeshment with each other.

2. The mechanism of claim 1, wherein said storage means includes a spindle, and a spool mounted on said spindle for storage of said belt in helical wrap.

3. The mechanism of claim 2, wherein said pinion gear is in contact with small and large radius surface portions respectively of said first and second cone gears when said belt is fully retracted, and means for changing the gear ratio of said cone gears by shifting said coupling means toward larger and smaller radius surface portions respectively of said first and second cone gears as said belt is protracted.

4. The mechanism of claim 3, wherein said first and second cone gears are identical to each other, and are oriented in opposite directions.

5. The mechanism of claim 4, wherein said biasing means is attached between said first cone gear shaft and said housing, and said spindle is formed on said second cone gear shaft.

6. The retractor mechanism of claim 1, wherein said housing includes a first compartment having an open end, said spool mounted in said first compartment, said belt being protractable from said housing through said open end.

7. The retractor mechanism of claim 1, wherein said housing further includes an enclosed compartment member, said gear train means being mounted inside said enclosed compartment member.

8. The retractor mechanism of claim 1, wherein said biasing means includes a helically coiled spring, one end of said spring being secured to said housing, and an opposite end of said spring being connected to said gear train means.

9. In a vehicle safety system including a safety belt adapted to restrain an occupant in position on a seat, a safety belt constant pull retracting mechanism comprising, in combination:
 a housing;
 storage means for storing said safety belt, said storage means operative for retracting and protracting said belt, said storage means including a spindle and a spool mounted on said spindle for storage of said belt in helical wrap;
 positive force characteristic biasing means for biasing said storage means for retraction of said belt; and
 gear train means for coupling together said biasing means and storage means, said gear train means having a negative coefficient of force transfer characteristic compensating for the positive coefficient of force transfer characteristic of said biasing means, a resultant pull applied to said belt thereby being approximately constant as said belt is protracting;
 said gear train means including variable gear ratio means for varying a gear coupling ratio during protraction of said belt and comprising a sector gear and a shaft secured to said sector gear at one side thereof, said sector gear having a variable radius rim, an effective radius of said sector gear being variable along said variable radius rim, and means for coupling together said biasing means and said spindle (1) at a small radius rim portion of said sector gear when said belt is fully retracted, and (2) at larger radius rim portions as said belt is protracted; said coupling means including spur and pinion gear means disposed between said sector gear and said spindle, said gear means including a pinion mounted on a shaft in said housing, said coupling means including an elongated guideway means for slidably supporting said shaft of said sector gear, said sector gear shaft sliding within said guideway during protraction of said belt for maintaining said sector in enmeshment with said pinion, a point of enmeshment between said sector gear and said pinion shifting between the small radius rim portion of said sector gear and the larger radius rim portions during said protraction.

10. The mechanism of claim 9, including idler gear means coupled between said sector gear and said biasing means for maintaining said sector gear in enmeshment with said pinion.

11. The mechanism of claim 10, including a spur gear secured to the shaft of said sector gear, said spur gear rotating together with said sector gear, said point of enmeshment shifting between the small and larger radius rim portions of said sector gear.

12. The mechanism of claim 11, wherein said idler gear means includes an idler gear rotatably supported on an arm, said arm being pivotally mounted to a shaft, and a spring member coupled between said arm and said sector gear for biasing said idler gear into enmeshment with said spur gear.

* * * * *